INVENTOR.
ROGER L. VEILLEUX
BY
ATTORNEY

Sept. 1, 1964    R. L. VEILLEUX    3,146,824
APPARATUS FOR COVERING TRUCK BODIES
Filed Jan. 8, 1963    2 Sheets-Sheet 2

INVENTOR.
ROGER L. VEILLEUX
BY
ATTORNEY

United States Patent Office
3,146,824
Patented Sept. 1, 1964

3,146,824
APPARATUS FOR COVERING TRUCK BODIES
Roger L. Veilleux, 36 Sisson Ave., Hartford, Conn.
Filed Jan. 8, 1963, Ser. No. 250,049
5 Claims. (Cl. 160—23)

The present invention relates to apparatus for covering the open bodies of pickup trucks and the like with a flexible cover.

It is an object of the present invention to provide apparatus for covering the body of a pickup truck and the like with a flexible cover which may be quickly and simply installed on a truck and which is simple and highly facile in operation to permit rapid opening and covering of the truck body.

It is also an object to provide such apparatus which is relatively simple and economical to manufacture and which enables positioning and holding the rear edge of a flexible cover at a plurality of positions along the length of the truck body.

Another object is to provide such apparatus wherein the flexible cover is substantially rolled within a housing in the stored position and the aperture in the housing is substantially closed in the stored position.

Other objects and advantages will be apparent from the following detailed description and claims and the attached drawings wherein:

Figure 1:
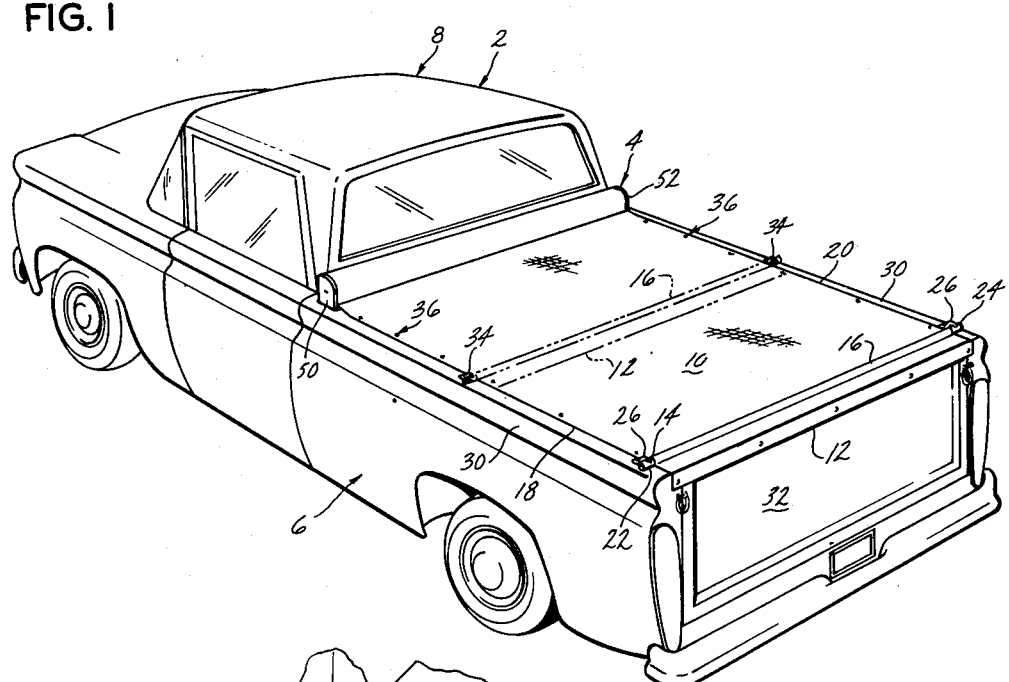
FIGURE 1 is a perspective view of a pickup truck employing apparatus embodying the present invention with the flexible cover thereof in fully covering position and showing the semiextended position of the cover in dotted line.

It has now been found that the foregoing and related objects can be readily attained by apparatus having an elongated housing adapted to be mounted on an associated pickup truck adjacent the front end of the body and to extend substantially across the width thereof and having an elongated aperture therein extending over the length thereof. An elongated spring roller assembly is rotatably mounted in the housing and a generally rectangular cover of flexible material having front, rear and side edges is mounted thereon at the front edge and extends out the aperture in the housing. The cover is rolled upon the spring roller assembly in a stored position substantially within the housing and is dimensioned to cover the body of an associated pickup truck when it is unrolled through the elongated aperture in the housing to covering position. A plurality of fastening means are mounted on the cover at spaced intervals along the side and rear edges thereof for detachable fastening of the cover to the body of an associated pickup truck, and locking means are provided for positioning and holding the rear edge of the cover at a predetermined position along the length of the body of an associated truck.

In the preferred form of the invention, the fastening means are snap fasteners having a first portion secured to the cover and a second portion adapted to be mounted adjacent the top edges of the side and rear walls of the body of an associated pickup truck so as to facilitate rapid and convenient covering and uncovering of the truck body. The positioning and holding of the rear edge of the cover with respect to the pickup truck body is accomplished by an elongated locking bar engaged with the cover parallel to and adjacent the rear edge thereof and having end portions extending outwardly from the side edges of the cover. Cooperating with the locking bar is a pair of locking members or hooks adapted to be mounted adjacent the top edges of the side walls of the body of an associated pickup truck outwardly of the side edges of the cover and to project upwardly therefrom to hold the extending end portions of the locking bar against the biasing pressure of the spring roller assembly, thus securing the rear edge of the cover in a desired position along the length of the body of an associated truck. Additionally the locking bar cooperates with the spring roller assembly to tension the cover over its entire width to provide a smooth, flat surface for a minimum of wind induced flapping action. A plurality of pairs of such locking members or hooks may be mounted along the length of the truck body for rapidly positioning and holding the rear edge of the cover in a plurality of spaced positions along the length of a pickup truck body.

The locking bar is adapted to be drawn into close-fitting alignment with the elongated aperture in the housing by the biasing pressure of the spring roller assembly to form a closure for the aperture when the cover is in a stored position. For some styles of truck construction having a body which is slightly spaced from the cab, the elongated housing may have a depending portion or flange for insertion between the cab and body and may be provided with ventilation and drainage apertures adjacent the bottom wall for retarding the growth of fungus such as mildew on the cover while it is stored within the housing.

Referring now in detail to FIGURE 1 of the attached drawings, therein illustrated is a pickup truck generally designated by the numeral 2 employing apparatus embodying the present invention and including the elongated housing 4 mounted on the front end of the truck body 6 adjacent the cab 8 and the cover 10 of flexible material which extends over the top of the truck body 6.

Figure 3:
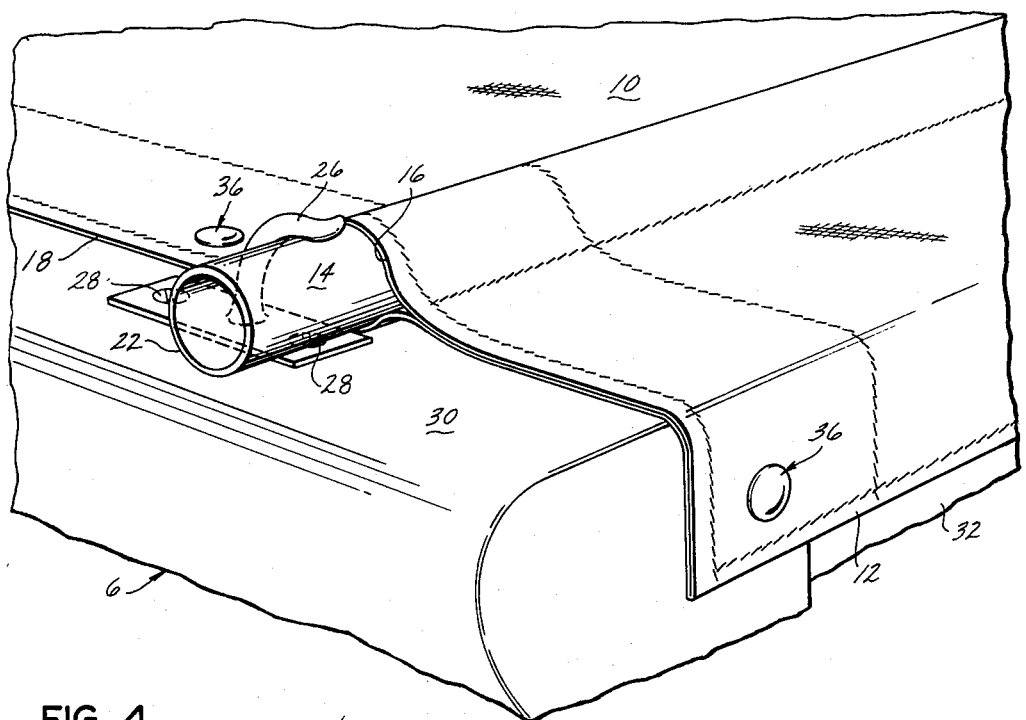
FIGURE 3 is a fragmentary perspective view to an enlarged scale of the rearward portion of the truck body of FIGURE 1.

As best seen in FIGURE 3, adjacent to but spaced inwardly from the rear edge 12 of the cover 10 is an elongated locking bar 14 which is secured in parallel relationship to the rear edge 12 within a pocket 16 formed in the cover 10. The locking bar 14 is dimensioned to extend beyond the side edges 18, 20 of the cover 10 so as to provide end portions 22, 24 which engage with a pair of locking members or hooks 26 mounted by threaded fasteners 28 on the top edges of the side walls 30 adjacent the rear wall 32 of the truck body 6. As shown in FIGURE 1, a second pair of locking members or hooks 34 is similarly mounted on the top edges of the side walls 30 of the truck body 6 substantially intermediate the length thereof to locate the cover 10 in a partially extended position.

Figure 6:
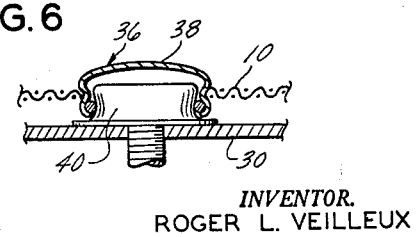
FIGURE 6 is a partial sectional view to an enlarged scale along the line 6—6 of FIGURE 2.

As best seen in FIGURE 1, the side edges 18, 20 and rear edge 12 of the cover 10 are secured to the side walls 30 and rear wall 32 of the truck body by a plurality of snap fasteners generally designated by the numeral 36. As shown in FIGURE 6, the snap fasteners 36 have a top portion 38 secured to the cover 10 and a bottom portion 40 mounted on the top edges of the side walls 30 and adjacent the top edge of the rear wall 32. In this manner, the cover 10 may be rapidly secured in relatively tight fitting engagement with the walls of the truck body 6 and also may be rapidly disengaged.

Figure 2:
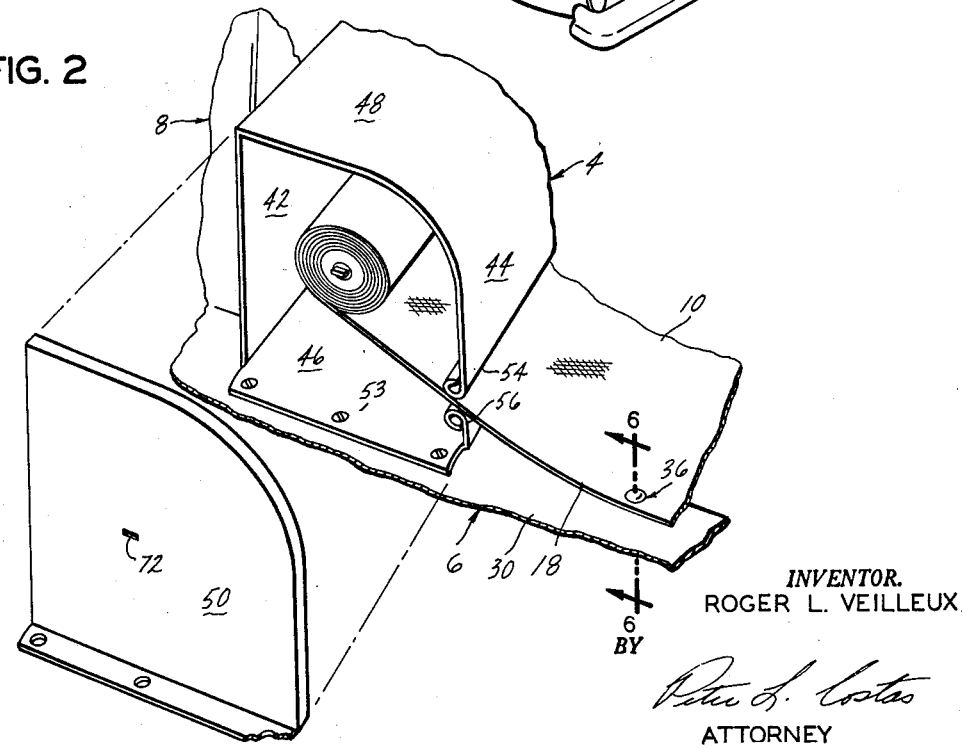
FIGURE 2 is a fragmentary perspective view to an enlarged scale of the forward portion of the truck body of FIGURE 1 adjacent the housing of the apparatus with the end well of the housing exploded therefrom for clarity of illustration.

Referring now to FIGURES 1 and 2 of the drawings, the housing 4 is elongated to extend across the width of the truck body 6 and has a front wall 42, rear wall 44, bottom wall 46, top wall 48 and end walls 50, 52. In this embodiment, the housing 4 is mounted upon the top edges of the side walls 30 of the body 6 by fasteners 53 which extend through the bottom wall 46. The rear wall 44 has an elongated narrow aperture defined between the spaced rounded lip portions 54, 56 and extending along the length thereof between the side walls 30 of the truck body 6 through which the cover 10 passes, and the spacing between the lip portions 54, 56 is less than the diameter of the locking bar 14 so as to prevent its entry thereinto.

Figure 5:
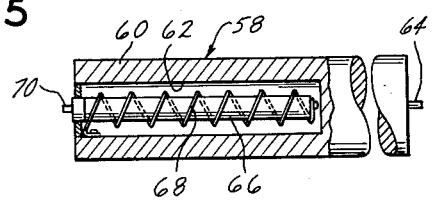
FIGURE 5 is a fragmentary longitudinal view in partial section and to an enlarged scale of the roller assembly in the apparatus of FIGURE 1.

The front edge (not shown) of the cover 10 is fastened upon the elongated spring roller assembly generally designated by the numeral 58, which is rotatably mounted within the housing 4 on the end walls 50, 52 thereof. As shown in FIGURE 5, the spring roller assembly 58 includes an elongated, generally cylindrical roller member 60 having a coaxial cylindrical aperture 62 in one end thereof and a cylindrical bearing pin 64 coaxially projecting from the other end thereof which rotatably seats in an aperture (not shown) in the end wall 52. Within the cylindrical aperture 62 is rotatably seated a bearing dowel 66 and a helical spring 68 is coiled about the dowel 66 within the aperture 62. The inner end of the spring 68 is anchored to the inner end of the dowel 66 and the outer end is anchored to the wall defining the aperture 62 adjacent the outer end thereof. The dowel 66 has a bearing pin 70 of rectangular cross section which is non-rotatably seated in the rectangular aperture 72 in the end wall 50, thus providing a spring roller assembly biased against rotation.

The cover 10 and the housing 4 are dimensioned to overlap the side walls 30 of the truck body 6 and the cover 10 is of sufficient length to overlap the rear wall 32 of the body when pulled out of the housing into fully extending covering position against the biasing pressure of the spring roller assembly 58. The cover 10 may be made of any suitable flexible material such as canvas, neoprene, and various synthetic plastic materials which provide a relatively water-impenetrable and long-lasting material.

Figure 4:
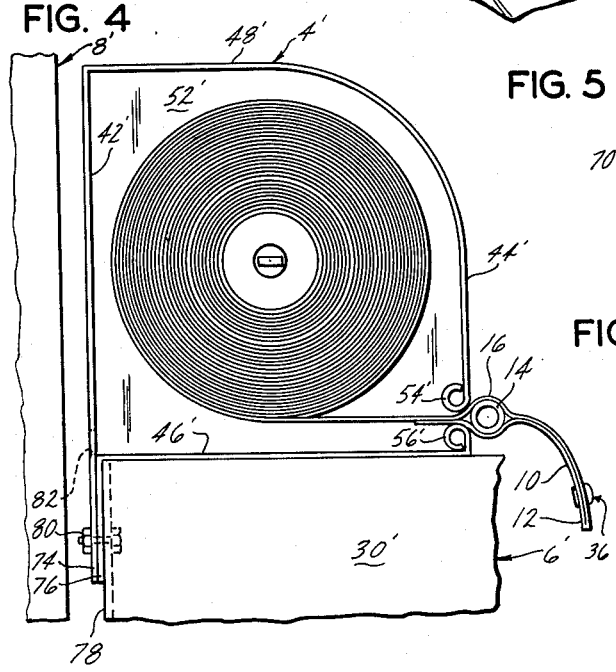
FIGURE 4 is a fragmentary side elevational view to an enlarged scale of the forward portion of an alternative style of truck body employing an alternative embodiment of housing for the apparatus with the end wall of the housing removed for clarity of illustration.

In FIGURE 4, an alternative style of pickup truck is shown wherein there is a spacing between the cab 8' and the front wall 78 of the body 6'. On such trucks, an alternative embodiment of housing is desirably employed wherein the top wall 48', front wall 42' and upper portion of the rear wall 44' are fabricated integrally and the front wall 42' has a depending portion 74 extending downwardly into the spacing between the truck body 6' and cab 8'. The bottom wall 46' and the lower portion of the rear wall 44' are integrally fabricated and a depending portion 76 is provided on the forward end of the bottom wall 46' which similarly extends downwardly between the cab 8' and truck body 6'. The depending portions 74, 76 are secured to the front wall 78 of the truck body 6' by the fasteners 80. Spaced along the lower portion of the front wall 42' of the housing 4 are a plurality of ventilation and drainage apertures 82 which thus open into the relatively protected spacing between the truck body 6' and cab 8' to minimize any tendency towards mildewing of the cover 10 when it is in stored position within the housing 4'.

In operation, the apparatus of the present invention is extremely simple and rapid to used. When covering the truck body 6, the cover 10 is drawn outwardly of the housing 4 to the desired extent against the biasing pressure of the spring roller assembly 58 and the end portions 22, 24 of the locking bar 14 engaged with the desired pair of locking members, such as the rearmost pair designated by the numeral 26, on the side walls 30 of the truck body 6 so as to position and hold the cover. As will be readily appreciated, the cover 10 is tensioned between the locking bar 14 and spring roller assembly 58 to provide a smooth flat surface. The operator may then engage the snap fasteners 36 along the edges of the cover 10 to hold it in tight-fitting engagement with the truck body and minimize any tendency toward flapping.

In FIGURE 1, a second pair of locking members 34 are provided intermediate the length of the body 6 so as to permit locating the cover 10 over but half the length thereof as indicated by the dotted line. As will be readily appreciated, additional pairs of locking members may be provided for similar positioning of the cover 10 at additional variations of cover extension.

When uncovering the truck body 6, the locking bar 14 and snap fasteners 36 are disengaged and the spring roller assembly 58 winds up the cover within the housing 4 until the locking bar 14 and the outer surfaces of the pocket 16 abut against the lip portions 54, 56 defining the aperture in the rear wall of the housing. In this manner, the cover 10 and locking bar 14 effectively serve as a closure for the aperture in the housing 4, as shown in FIGURE 4, thus substantially protecting the coiled cover from dirt, water and other contaminants.

The apparatus of the present invention may be readily installed upon pickup trucks or the like by mounting the housing 4 upon the forward end of the truck body 6 and securing the locking members 26, 34 and fasteners 36 in the desired location. If so desired, the housing 4 may be telescoping to accommodate variations in width of truck bodies.

Thus, it can be seen that the apparatus of the present invention provides quick and facile means for covering and uncovering a pickup truck body. The simplicity of operation enables even the unpracticed individual to use the apparatus at a moment's notice effecting a saving of time which is particularly important in the event of inclement weather. The apparatus may be quickly installed on a pickup truck by one man, and is relatively inexpensive both in initial investment and maintenance. Moreover, the apparatus may be simply and relatively inexpensively manufactured from readily available material, such as sheet metal for a durable housing; canvas or synthetic textile material for a strong, flexible weather-resistant cover; and metal tubing or wood for a strong, lightweight locking bar. The locking effect achieved by the locking bar and hook in cooperation with the spring roller assembly results in rapid positioning of the cover and a strong, dependable weather-resistant covering for an otherwise open pickup truck body.

Although but one specific embodiment of the invention has been shown and described herein, it will be understood that modifications may be made within the spirit of the invention.

Having thus described the invention, I claim:

1. Apparatus for covering the top of a pickup truck body and the like comprising an elongated housing adapted to be mounted on an associated pickup truck adjacent the front end of the body and to extend substantially across the width thereof, said housing having front, rear, top, bottom and end walls, said rear wall having an elongated aperture therein extending generally horizontally of the housing and substantially across the length thereof; an elongated spring roller assembly rotatably mounted within said housing on the end walls thereof; a generally rectangular cover of flexible material narrower in width than the length of said aperture in said housing having front, rear, and side edges, said cover being mounted at the front edge thereof on said spring roller assembly and rolled thereon in a stored position substantially within said housing and dimensioned to cover the top of the body of the pickup truck when unrolled through said aperture to a covering position; an elongated locking bar engaged with said cover generally parallel to and adjacent the rear edge thereof and having end portions extending outwardly from the side edges of said cover, said locking bar being adapted to be drawn into close-fitting alignment with said elongated aperture in said housing assembly by the biasing action of said spring roller assembly to form a closure for said aperture when said cover is in stored position; a plurality of pairs of hook members adapted to be mounted adjacent the top edges of the side walls of the body of the pickup truck to project upwardly therefrom for holding the extending end portions of said locking bar against the biasing pressure of said spring roller assembly and positioning the rear edge of said cover in a predetermined position along the length of the body of the pickup truck; and a plurality of snap fasteners mounted on said cover at predetermined spaced intervals along the side and rear edges thereof, said snap fasteners having a first portion secured to said cover and a second portion adapted to be mounted adjacent the top edges of the side and rear walls of the body of the pickup truck for rapid detachable covering of the top of the pickup truck body, said predetermined position of said locking bar and predetermined spaced intervals of said snap fasteners ensuring substantial and rapid alignment of the snap fastener portions upon engagement of said locking bar by one of said pairs of hook members.

2. The apparatus of claim 1 wherein said housing has a depending portion for insertion between the cab and body of the pickup truck and wherein the front wall of said housing has venting apertures adjacent the lower end thereof.

3. Apparatus for covering the top of a pickup truck body and the like comprising an elongated housing adapted to be mounted on an associated pickup truck adjacent the front end of the body and to extend substantially across the width thereof, said housing having an elongated aperture therein adjacent the rear portion thereof extending generally horizontally of the housing and along substantially the length thereof; an elongated spring roller assembly rotatably mounted in said housing; a generally rectangular cover of flexible material narrower in width than the length of the aperture in said housing and having front, rear, and side edges, said cover being mounted at the front edge thereof on said spring roller assembly and rolled thereupon in a stored position substantially within said housing and being dimensioned to cover the top of the body of the pickup truck when unrolled through said aperture to a covering position; an elongated locking bar engaged with said cover generally parallel to and adjacent the rear edge thereof, said locking bar being dimensioned and adapted to be drawn into close-fitting alignment with said elongated aperture in said housing assembly by the biasing action of said spring roller assembly to form a closure for said aperture when said cover is in stored position; a pair of locking members adapted to be mounted adjacent the top edges of the side walls of the body of the pickup truck and to project upwardly therefrom for engagement with said locking bar adjacent the ends thereof to hold said bar against the biasing action of said spring roller assembly and securing the rear edge of said cover in a predetermined position along the length of the body of the truck; and a plurality of fastening means mounted on said cover at predetermined spaced intervals along the side edges thereof for rapid detachable fastening of the cover to the top of the body of the truck.

4. The apparatus of claim 3 wherein said fastening means are snap fasteners having a first portion secured to said cover and a second portion adapted to be mounted adjacent the top edge of the side walls of the body of a pickup truck in alignment with said first portion when said locking bar is engaged with said locking members for rapid detachable covering of the top of the pickup truck body, said predetermined position of said locking bar and said predetermined spaced intervals of said fastening means ensuring substantial and rapid alignment of the fastener portions upon engagement of said locking bar by said locking members.

5. The apparatus of claim 3 wherein a first pair of locking members is adapted to be mounted adjacent the rear of the body of the pickup truck for covering entirely the top of the body of the pickup truck, and wherein a second pair of locking members is adapted to be mounted adjacent the top edges of the side walls of the body of the pickup truck intermediate the length of the body of the pickup truck for partially covering the top of the body of the pickup truck.

References Cited in the file of this patent

UNITED STATES PATENTS

| | | |
|---|---|---|
| 1,222,137 | Ricard | Apr. 10, 1917 |
| 1,538,485 | Holtom | May 19, 1925 |
| 1,823,290 | Prawalsky | Sept. 15, 1931 |
| 2,338,378 | Hardy | Jan. 4, 1944 |
| 2,473,058 | Hoeldtke | June 14, 1949 |
| 2,773,547 | Voss | Dec. 11, 1956 |
| 3,021,894 | La Due | Feb. 20, 1962 |

FOREIGN PATENTS

| | | |
|---|---|---|
| 566,571 | Canada | Nov. 25, 1958 |